United States Patent
Tanaka et al.

(10) Patent No.: US 10,906,223 B2
(45) Date of Patent: Feb. 2, 2021

(54) CONTROL DEVICE FOR INJECTION MOLDING MACHINE AND CONTROL METHOD FOR INJECTION MOLDING MACHINE

(71) Applicant: FANUC CORPORATION, Yamanashi (JP)

(72) Inventors: Kazuyoshi Tanaka, Yamanashi-ken (JP); Junpei Maruyama, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/364,728

(22) Filed: Mar. 26, 2019

(65) Prior Publication Data
US 2019/0299509 A1    Oct. 3, 2019

(30) Foreign Application Priority Data

Mar. 29, 2018  (JP) .................... 2018-065358

(51) Int. Cl.
*B29C 45/76*    (2006.01)
*G05B 19/18*    (2006.01)

(52) U.S. Cl.
CPC .......... *B29C 45/762* (2013.01); *G05B 19/182* (2013.01); *B29C 2945/76648* (2013.01);
(Continued)

(58) Field of Classification Search
USPC ........................................................ 700/200
See application file for complete search history.

(56) References Cited

U.S. PATENT DOCUMENTS

2008/0031992 A1 *  2/2008  Matsuo ................ B29C 45/762
                                                              425/155

FOREIGN PATENT DOCUMENTS

JP         H0486225 A  *  3/1992
JP         H04086225 A     3/1992
(Continued)

OTHER PUBLICATIONS

Mehlhorn, Kurt, and Peter Sanders. Algorithms and data structures: The basic toolbox. Springer Science & Business Media, 2008. pp. 81-86. DOI: 10.1007/978-3-540-77978-0 retrieved from Springer.com Apr. 10, 2020. (Year: 2008).*

(Continued)

*Primary Examiner* — Mohammad Ali
*Assistant Examiner* — Joshua T Sanders
(74) *Attorney, Agent, or Firm* — Fredrikson & Byron, P.A.

(57) ABSTRACT

A control device for an injection molding machine has a first operation condition setup unit for setting an operation condition for a setting operation, a conversion table for storing in pairs an operation condition for the setting operation and an operation condition for a pull operation, a second operation condition setup unit for setting, by reference to the conversion table, an operation condition for the pull operation in correspondence to the operation condition for the setting operation set by the first operation condition setup unit, and a driving command generation unit for generating driving commands which drive the injection molding machine to perform the setting operation and the pull operation in accordance with the operation conditions set by the first operation condition setup unit and the second operation condition setup unit.

6 Claims, 10 Drawing Sheets

(52) U.S. Cl.
CPC ............... *B29C 2945/76732* (2013.01); *B29C 2945/76822* (2013.01); *B29C 2945/76866* (2013.01); *G05B 2219/45244* (2013.01)

(56) References Cited

FOREIGN PATENT DOCUMENTS

| | | |
|---|---|---|
| JP | H07186153 A | 7/1995 |
| JP | 2659480 B2 | 9/1997 |
| JP | 200798810 A | 4/2007 |
| JP | 2008036976 A | 2/2008 |

OTHER PUBLICATIONS

English Abstract and Machine Translation for Japanese Publication No. 2007-098810 A, published Apr. 19, 2007, 7 pgs.
English Abstract and Machine Translation for Japanese Publication No. 2659480 B2, published Sep. 30, 1997, 8 pgs.
English Abstract and Machine Translation for Japanese Publication No. JPH04-086225A, published Mar. 18, 1992, 7 pgs.
English Abstract and Machine Translation for Japanese Publication No. JPH07-186153A, published Jul. 25, 1995, 7 pgs.
English Abstract and Machine Translation for Japanese Publication No. JP2008-036976A, published Feb. 21, 2008, 7 pgs.

\* cited by examiner

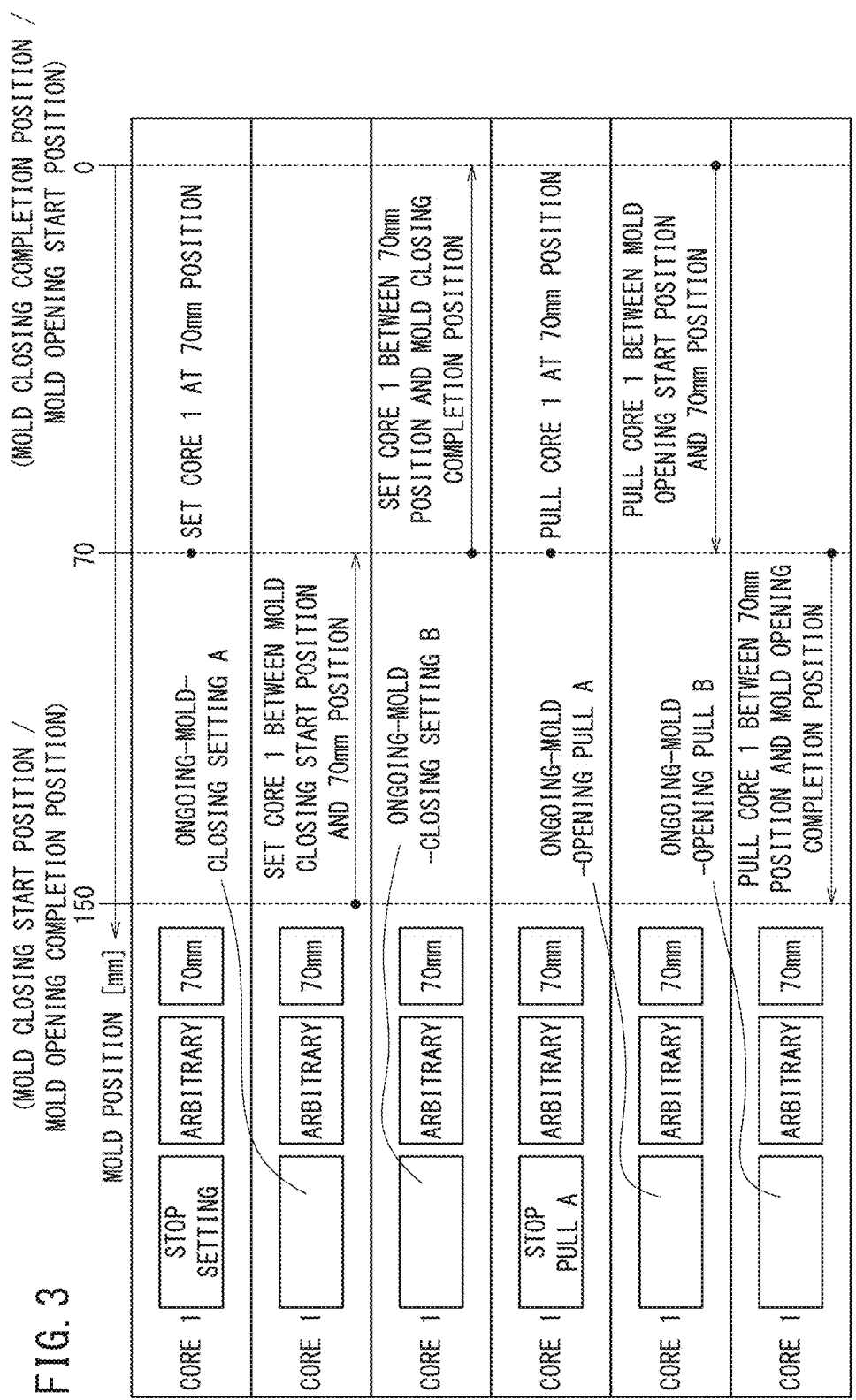

FIG. 4

| CORE SETTING MODE | CORE PULL MODE |
|---|---|
| STOP SETTING | STOP PULL |
| ONGOING-MOLD -CLOSING SETTING A | ONGOING-MOLD -OPENING PULL B |
| ONGOING-MOLD -CLOSING SETTING B | ONGOING-MOLD -OPENING PULL A |
| CORE SETTING START MODE | CORE PULL START MODE |
| MOLD CLOSING START | MOLD OPENING COMPLETION |
| INJECTION START | MOLD OPENING START |
| ARBITRARY | ARBITRARY |
| REMOVAL COMPLETION | REMOVAL START |
| PARALLEL Nc | PARALLEL Nc |
| CONTINUATION Nc | CONTINUATION Nc |

CONTROL DEVICE FOR INJECTION MOLDING MACHINE AND CONTROL METHOD FOR INJECTION MOLDING MACHINE

CROSS-REFERENCE TO RELATED APPLICATION

This application is based upon and claims the benefit of priority from Japanese Patent Application No. 2018-065358 filed on Mar. 29, 2018, the contents of which are incorporated herein by reference.

BACKGROUND OF THE INVENTION

Field of the Invention

The present invention relates to a control device for an injection molding machine and a control method for an injection molding machine for controlling a setting operation to set a core in a mold in conjunction with a mold closing operation in the injection molding machine and for controlling a pull operation to remove the core from the mold in conjunction with a mold opening operation.

Description of the Related Art

Japanese Laid-Open Patent Publication No. 2007-098810 discloses a technology in which when changing operation conditions concerning a certain core, such as the sequential order of core removing process for removing the core from a mold and the position of the mold from which the core is removed, the operation conditions for other cores are automatically changed.

SUMMARY OF THE INVENTION

In the technology of Japanese Laid-Open Patent Publication No. 2007-098810, changing of the operation condition in the pull operation for removing the core from the mold (i.e., core removing process) is partially automated. However, an operation condition for an initial pull operation is required to be set by the operator, so that the burden on the operator is heavy.

The present invention has been made in order to solve the foregoing problem, and it is an object of the present invention to provide a control device for an injection molding machine and a control method for an injection molding machine capable of reducing the burden on the operator in setting operation conditions for a setting operation to set a core in a mold and for a pull operation to remove the core from the mold.

In a first aspect, the present invention resides in a control device for an injection molding machine, the control device being configured to control a setting operation for setting a core in a mold in conjunction with a mold closing operation of the mold in the injection molding machine and a pull operation for removing the core from the mold in conjunction with a mold opening operation of the mold, wherein the control device includes a first operation condition setup unit configured to set an operation condition for one of the core setting operation and the core pull operation; a conversion table configured to store, in pairs, an operation condition for the core setting operation and an operation condition for the core pull operation corresponding to the operation condition for the core setting operation; a second operation condition setup unit configured to set, by reference to the conversion table, an operation condition for the other of the core pull operation and the core setting operation in correspondence to the operation condition, set by the first operation condition setup unit, for the one of the core setting operation and the core pull operation; and a driving command generation unit configured to generate a driving command configured to drive the injection molding machine to perform the setting operation and the pull operation in accordance with the operation conditions set by the first operation condition setup unit and the second operation condition setup unit.

In a second aspect, the present invention resides in a control method for an injection molding machine, for controlling a setting operation for setting a core in a mold in conjunction with a mold closing operation of a mold in the injection molding machine and a pull operation for removing the core from the mold in conjunction with a mold opening operation of the mold, wherein the control method includes a first operation condition setting step of setting an operation condition for one of the core setting operation and the core pull operation; a second operation condition setting step of setting an operation condition for the other of the core pull operation and the core setting operation in correspondence to the operation condition, set at the first operation condition setting step, for the one of the core setting operation and the core pull operation, by reference to a conversion table configured to store, in pairs, an operation condition for the core setting operation and an operation condition for the core pull operation corresponding to the operation condition for the core setting operation; and a driving command generation step of generating a driving command configured to drive the injection molding machine to perform the setting operation and the pull operation in accordance with the operation conditions set at the first operation condition setting step and the second operation condition setting step.

According to the present invention, it is possible to reduce the burden on the operator in setting operation conditions for the setting operation for setting the core in the mold and the pull operation for removing the core from the mold.

The above and other objects, features, and advantages of the present invention will become more apparent from the following description when taken in conjunction with the accompanying drawings, in which a preferred embodiment of the present invention is shown by way of an illustrative example.

BRIEF DESCRIPTION OF THE DRAWINGS

FIG. 3 is an explanatory chart for explaining core setting modes and core pull modes;

FIG. 4 is a table showing a conversion table;

DESCRIPTION OF THE PREFERRED EMBODIMENTS

First Embodiment

[Configuration of Injection Molding Machine and Control Device]

Figure 1:
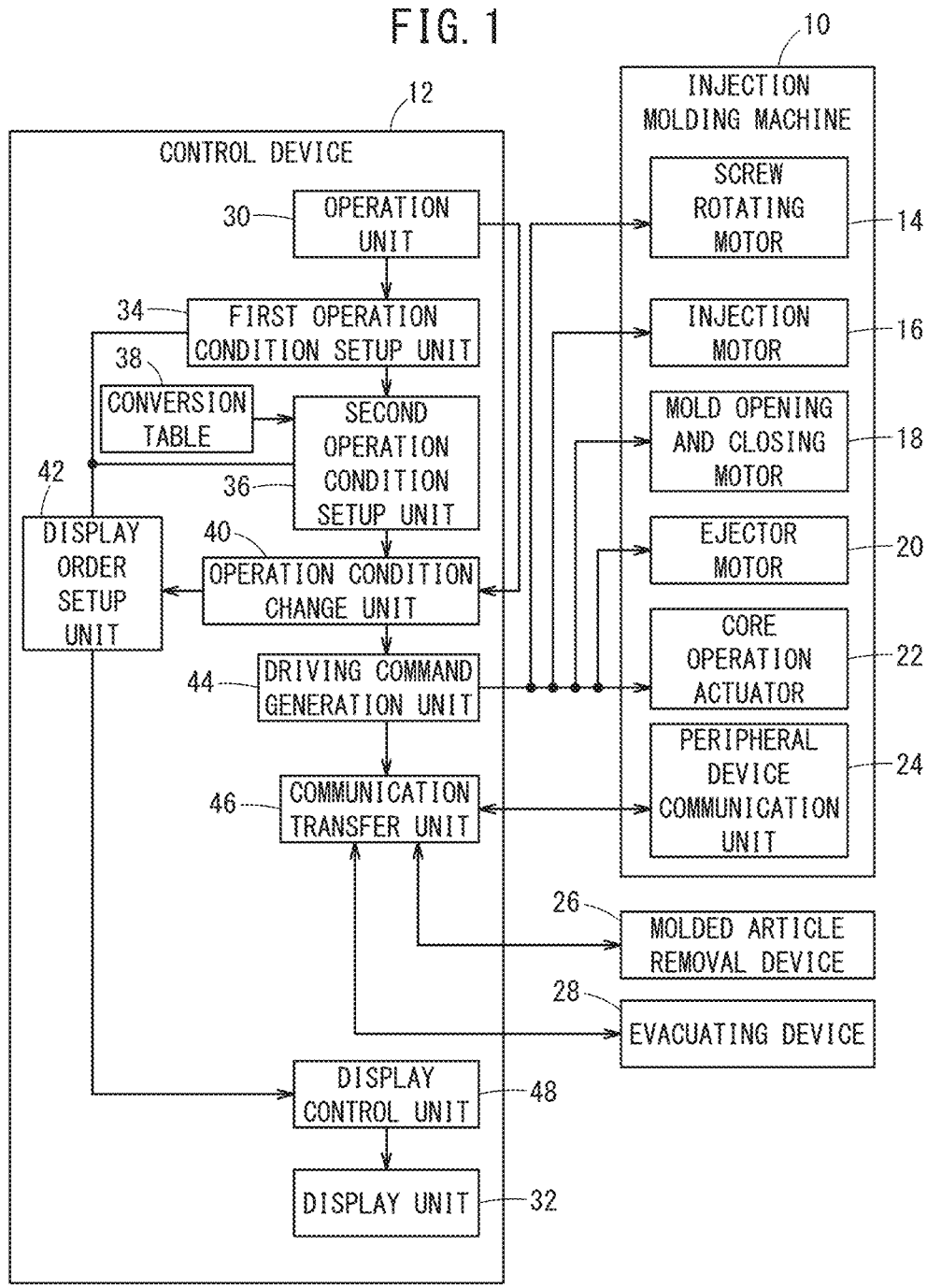
FIG. 1 is a block diagram showing configurations of an injection molding machine and a control device for controlling the injection molding machine.

FIG. 1 is a block diagram showing configurations of an injection molding machine 10 and a control device 12 for controlling the injection molding machine 10. The injection molding machine 10 has a screw rotating motor 14, an injection motor 16, a mold opening and closing motor 18, an ejector motor 20, a core operation actuator 22, and a peripheral device communication unit 24.

The screw rotating motor 14 is a motor for rotating a screw of an injection mechanism about its axis. The injection motor 16 is a motor for linearly driving the screw in the axial direction. The rotation of the screw causes a resin material to be moved in a cylinder in a nozzle direction. While the injection motor 16 applies a back pressure to the screw, the screw is rotated by the screw rotating motor 14 to perform a metering operation for supplying a predetermined amount of resin to an end of the cylinder. Then, the screw is moved by the injection motor 16 in the nozzle direction to perform an injection operation in which the resin material in the cylinder is injected from the nozzle into a mold. After the mold is filled with the resin material, the screw is continued to be pressed by the injection motor 16 in the nozzle direction to thereby perform a pressure holding operation for applying a pressure to the resin material until a gate is cured.

The mold opening and closing motor 18 is a motor for driving a movable platen toward a stationary platen in a mold clamping mechanism. The mold opening and closing motor 18 operates to perform a mold closing operation in which the movable platen is moved in a direction toward the stationary platen to thereby close the mold, and a mold opening operation in which the movable platen is moved in a direction away from the stationary platen to thereby open the mold.

The ejector motor 20 is a motor for driving an ejector pin provided in the movable platen. The ejector pin is moved by the ejector motor 20 in an advance direction, whereby a removal operation is performed to remove a molded article from the movable mold provided on the movable platen. Upon completion of the removing of the molded article from the movable mold, the ejector pin is driven by the ejector motor 20 in a retraction direction. The core operation actuator 22 comprises a hydraulic cylinder or the like and is an actuator for performing a setting operation to set a core in the mold and a pull operation to remove the core from the mold.

The peripheral device communication unit 24 executes communications with peripheral devices such as a molded article removal device 26, an evacuating device (vacuumizing device) 28 and the like. The peripheral device communication unit 24 performs a signal output operation for outputting communication signals to the control device 12. The control device 12 transfers communication signals outputted from the peripheral device communication unit 24 to the molded article removal device 26 and the evacuating device 28. Further, the control device 12 transfers communication signals outputted from the molded article removal device 26 and the evacuating device 28 to the peripheral device communication unit 24. The peripheral device communication unit 24 performs a signal input operation for inputting thereto the communication signals sent from the control device 12.

The molded article removal device 26 is a device for performing a removal operation to take out a molded article from the injection molding machine 10. Upon completion of the mold opening of the mold, the injection molding machine 10 transmits a communication signal requesting a removal operation from the peripheral device communication unit 24 to the control device 12. The communication signal requesting the removal operation is transferred from the control device 12 to the molded article removal device 26. The molded article removal device 26 starts a removal operation of the molded article when receiving the communication signal requesting the removal operation. The molded article removal device 26, when completing the removal operation of the molded article, transmits to the control device 12 a communication signal notifying the completion of the removal operation. The communication signal notifying the completion of the removal operation is transferred from the control device 12 to the peripheral device communication unit 24.

The evacuating device 28 is a device for performing an evacuating (vacuumizing) operation for evacuating (vacuumizing) the interior of the mold. Upon completion of a mold closing, the injection molding machine 10 transmits a communication signal requesting the evacuating operation from the peripheral device communication unit 24 to the control device 12. The communication signal requesting the evacuating operation is transferred from the control device 12 to the evacuating device 28. The evacuating device 28, upon receiving the communication signal requesting the evacuating operation, opens a valve between a vacuum tank and the mold to start the evacuating operation.

The evacuating device 28, when completing the opening of the valve between the vacuum tank and the mold, transmits to the control device 12 a communication signal notifying the completion of the valve opening. The communication signal notifying the completion of the valve opening is transmitted from the control device 12 to the peripheral device communication unit 24.

[Configuration of Control Device]

The control device 12 has an operation unit 30, a display unit 32, a first operation condition setup unit 34, a second operation condition setup unit 36, a conversion table 38, an operation condition change unit 40, a display order setup unit 42, a driving command generation unit 44, a communication transfer unit 46, and a display control unit 48.

The operation unit 30 comprises a touch panel, a keyboard, a mouse and the like and inputs information to the control device 12 by being operated by the operator. The display unit 32 comprises a liquid-crystal display and the like and displays letters, symbols, illustrations and the like.

Figure 2:
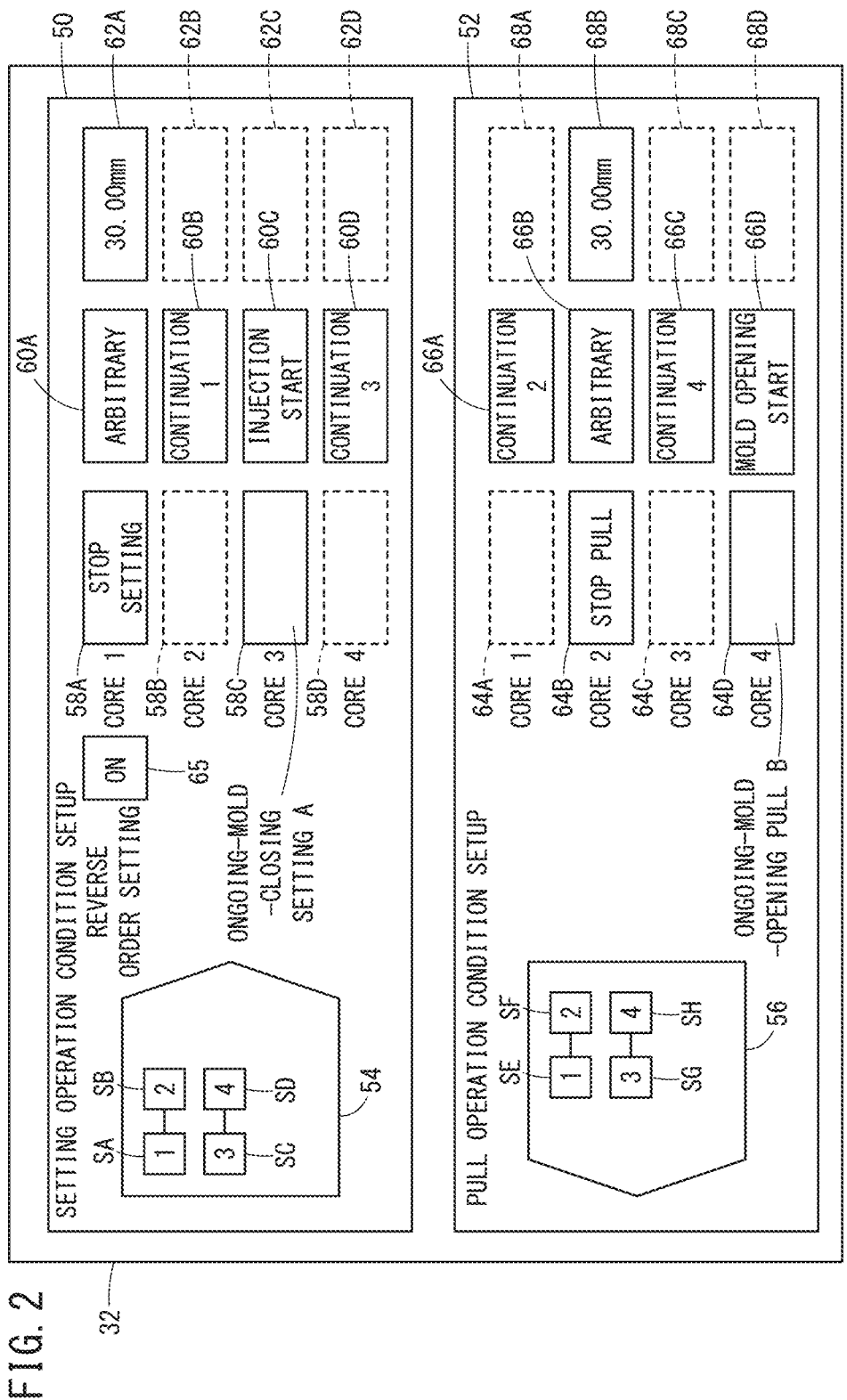
FIG. 2 is an illustration showing a setting operation condition setup screen and a pull operation condition setup screen displayed on a display unit.

FIG. 2 is an illustration showing a setup screen 50 (hereafter referred to as a setting operation condition setup screen 50) for operation conditions for core setting operations and a setup screen 52 (hereafter referred to as a pull operation condition setup screen 52) for operation conditions for core pull operations, the screens 50 and 52 being displayed on the display unit 32.

The operation unit 30 is operated by the operator, so that operation conditions for the setting operations of four cores of core 1 to core 4 are selected on the setting operation condition setup screen 50 displayed on the display unit 32. The first operation condition setup unit 34 sets operation conditions for setting operations of the respective cores in accordance with the selected operation conditions for the setting operations of the respective cores. Incidentally, even in the case where the operation conditions for the setting operations of the respective cores are not selected by the operator's operation of the operation unit 30, the operation conditions for the setting operations of the respective cores may be automatically set by the first operation condition setup unit 34.

The operation unit 30 is operated by the operator, so that operation conditions for the pull operations of the four cores of core 1 to core 4 are selected on the pull operation condition setup screen 52 displayed on the display unit 32. The second operation condition setup unit 36 sets operation conditions for the pull operations of the respective cores in accordance with the selected operation conditions for the pull operations of the respective cores. Further, the second operation condition setup unit 36 is also able to automatically set the operation conditions for the pull operations of the respective cores in correspondence to the operation conditions for the setting operations which have been set by the first operation condition setup unit 34.

The conversion table 38 is used when the second operation condition setup unit 36 automatically sets the operation conditions for the pull operations of the respective cores. The conversion table 38 is stored in a storage device such as a hard disc, a memory and the like. The conversion table 38 will be described later in detail.

The operation condition change unit 40 changes the operation conditions for the pull operations of the respective cores which have been automatically set by the second operation condition setup unit 36. The changing of the operation conditions for the pull operations of the respective cores is performed by the operator operating the operation unit 30 to thereby change the selection of the operation conditions for the pull operations of the four cores of core 1 to core 4 on the pull operation condition setup screen 52 displayed by the display unit 32. Incidentally, the changing of the selection of the operation conditions for the pull operations of the four cores of core 1 to core 4 may be carried out by any operation performed by the operator, and the operation performed by the operator are not limited to the operation of the operation unit 30.

The display order setup unit 42 sets a display order of symbols SA to SD indicative of the setting operations of the respective cores and displayed at a setting operation confirmation portion 54 on the setting operation condition setup screen 50. The display order setup unit 42 also sets a display order of symbols SE to SH indicative of the pull operations of the respective cores and displayed at a pull operation confirmation portion 56 of the pull operation condition setup screen 52.

The driving command generation unit 44 generates driving commands for driving the screw rotating motor 14, the injection motor 16, the mold opening and closing motor 18, the ejector motor 20 and the core operation actuator 22 of the injection molding machine 10.

The display control unit 48 controls the display unit 32 to display the setting operation condition setup screen 50 and the pull operation condition setup screen 52.

The communication transfer unit 46 transfers the communication signals sent from the injection molding machine 10 to the molded article removal device 26 and the evacuating device 28. Further, the communication transfer unit 46 transfers the communication signals sent from the molded article removal device 26 and the evacuating device 28 to the injection molding machine 10.

[Setting Operation Condition Setup Screen]

The operator sets the operation conditions for the setting operations of the four cores of core 1 to core 4 on the setting operation condition setup screen 50 shown in FIG. 2. The setting operation condition setup screen 50 is composed of core setting mode selection portions 58A to 58D, core setting start mode selection portions 60A to 60D, core setting option setup portions 62A to 62D, a reverse order setting selection portion 65, and the setting operation confirmation portion 54. Incidentally, in FIG. 2 and later described FIGS. 5 and 7, the frame indicated by the dashed line is the frame which is not displayed or the frame which is displayed in a paler color than the frame shown by the solid line.

By operating the operation unit 30, the operator is able to select one core setting mode from among "stop setting (stop setting mode)", "ongoing-mold-closing setting A (first ongoing-mold-closing setting mode)", and "ongoing-mold-closing setting B (second ongoing-mold-closing setting mode)" at the core setting mode selection portions 58A to 58D.

By operating the operation unit 30, the operator is able to select one core setting start mode from among "mold closing start", "injection start", "arbitrary", "removal completion (removal completion setting mode)", "parallel 1", "parallel 2", "parallel 3", "parallel 4", "continuation 1", "continuation 2", "continuation 3", and "continuation 4" at the core setting start mode selection portions 60A to 60D.

In the case where "arbitrary" is selected as the core setting start mode, the operator, by operating the operation unit 30, is able to designate an arbitrary position of the movable mold as the core setting option at the core setting option setup portions 62A to 62D.

By operating the operation unit 30, the operator is able to select one of "ON" and "OFF" at the reverse order setting selection portion 65.

The setting operation confirmation portion 54 displays symbols SA to SD indicative of the setting operations of the respective cores based on selection results at the core setting mode selection portions 58A to 58D and the core setting start mode selection portions 60A to 60D.

[Pull Operation Condition Setup Screen]

The operator is able to set the operation conditions for the pull operations of the four cores of core 1 to core 4 at the pull operation condition setup screen 52 shown in FIG. 2. The pull operation condition setup screen 52 is composed of core pull mode selection portions 64A to 64D, core pull start mode selection portions 66A to 66D and core pull option setup portions 68A to 68D.

By operating the operation unit 30, the operator is able to select one core pull mode of "stop pull (stop pull mode)", "ongoing-mold-opening pull A (second ongoing-mold-opening pull mode)" and "ongoing-mold-opening pull B (first ongoing-mold-opening pull mode)" at the core pull mode selection portions 64A to 64D.

By operating the operation unit 30, the operator is able to select one core pull start mode of "mold opening start", "mold opening completion", "arbitrary", "removal start (removal start pull mode)", "parallel 1", "parallel 2", "parallel 3", "parallel 4", "continuation 1", "continuation 2", "continuation 3", and "continuation 4" at the core pull start mode selection portions 66A to 66D.

In the case where "arbitrary" is selected as the core pull start mode, the operator, by operating the operation unit 30, is able to designate an arbitrary position of the movable mold as the core pull option at the core pull option setup portions 68A to 68D.

Incidentally, in the case where "ON" is selected at the reverse order setting selection portion 65 of the setting operation condition setup screen 50, the core pull mode, the core pull start mode and the core pull option are displayed respectively at the core pull mode selection portions 64A to 64D, the core pull start mode selection portions 66A to 66D and the core pull option setup portions 68A to 68D in accordance with the operation condition for the core pull operation which has been automatically set by the second operation condition setup unit 36.

The pull operation confirmation portion 56 displays symbols SE to SH indicating the pull operations of the respective cores, depending on the selection results at the core pull mode selection portions 64A to 64D and the core pull start mode selection portions 66A to 66D.

[About Core Setting Mode and Core Pull Mode}

FIG. 3 is an explanatory chart for explaining the core setting mode and the core pull mode. FIG. 3 shows six specific examples about the core setting modes and the core pull modes. Further, in FIG. 3, the position of the movable mold at the mold closing start time and the mold opening completion time is assumed as a 150 mm (millimeter), while the position of the movable mold at the injection start time and the mold opening start time is assumed as a 0 (zero) mm. Incidentally, in the following description, the position of the movable mold at the mold closing start time and the mold opening completion time may occasionally be written as a mold closing start position or a mold opening completion position. Further, the position of the movable mold at the injection start time and the mold opening start time may occasionally be written as an injection start position, a mold closing completion position or a mold opening start position.

In FIG. 3, the first row represents a situation that for core 1, the core setting mode is set to "stop setting", the core setting start mode is set to "arbitrary", and the core setting option is set to "70 mm". In this case, after the mold closing is started, the movable mold is stopped at a position of 70 mm (70 mm position), and core 1 is then set in the mold. After core 1 is set, the mold closing is resumed.

The second row in FIG. 3 represents a situation that for core 1, the core setting mode is set to "ongoing-mold-closing setting A", the core setting start mode is set to "arbitrary", and the core setting option is set to "70 mm". In this case, core 1 is set in the mold while the movable mold is in motion and is moving from the mold closing start position to the 70 mm position.

The third row in FIG. 3 represents a situation that for core 1, the core setting mode is set to "ongoing-mold-closing setting B", the core setting start mode is set to "arbitrary", and the core setting option is set to "70 mm". In this case, core 1 is set in the mold while the movable mold is in motion and is moving from the 70 mm position to the mold closing completion position.

The fourth row in FIG. 3 represents a situation that for core 1, the core pull mode is set to "stop pull", the core pull start mode is set to "arbitrary", and the core pull option is set to "70 mm". In this case, after the mold opening is started, the movable mold is stopped at the 70 mm position and core 1 is then removed from the mold. After the core 1 is removed, the mold opening is resumed.

The fifth row in FIG. 3 represents a situation that for core 1, the core pull mode is set to "ongoing-mold-opening pull A", the core pull start mode is set to "arbitrary", and the core pull option is set to "70 mm". In this case, core 1 is removed from the mold while the movable mold is in motion and is moving from the mold opening start position to the 70 mm position.

The sixth row in FIG. 3 represents a situation that for core 1, the core pull mode is set to "ongoing-mold-opening pull B", the core pull start mode is set to "arbitrary", and the core pull option is set to "70 mm". In this case, core 1 is removed from the mold while the movable mold is in motion and is moving from the 70 mm position to the mold opening completion position.

[About Core Setting Start Mode and Core Pull Start Mode]

Of the core setting start modes, the following three modes, i.e., "mold closing start", "injection start" and "arbitrary", are each set together with the core setting mode and each designate the position of the movable mold. Similarly, of the core pull start modes, the following three modes, i.e., "mold opening start", "mold opening completion" and "arbitrary", are each set together with the core pull mode and each designate the position of the movable mold.

When, of the core setting start modes, "removal completion" is selected, the molded article is removed from the mold by the ejector pin, and after the retraction of the ejector pin is completed, the setting operation of the core is performed. When, of the core pull start modes, "removal start" is selected, the pull operation of the core is performed when the removal operation is started in order to remove the molded article form the mold by the ejector pin.

When, of the core setting start modes and the core pull start modes, "parallel 1", "parallel 2", "parallel 3" or "parallel 4" is selected, the setting operation or the pull operation is performed in parallel with the setting operation or the pull operation for another core. For example, when "parallel 2" is selected as the core setting start mode for core 1, the setting operation for core 1 is performed in parallel with the setting operation for core 2.

When, of the core setting start modes and the core pull start modes, "continuation 1", "continuation 2", "continuation 3" or "continuation 4" is selected, the setting operation or the pull operation is performed successively after the setting operation or the pull operation for another core is completed. For example, when "continuation 2" is selected as the core setting start mode for core 1, the setting operation for core 1 is performed successively after the setting operation for core 2 is completed.

[Conversion Table]

FIG. 4 is a table showing the conversion table 38. The conversion table 38 is used when the second operation condition setup unit 36 automatically sets the operation condition for the pull operation of each core. The conversion table 38 stores core setting modes and core pull modes corresponding to the respective core setting modes in pairs. Further, the conversion table 38 stores core setting start modes and core pull start modes corresponding to the respective core setting start modes in pairs.

For example, as shown in FIG. 4, "ongoing-mold-closing setting A" of the core setting mode and "ongoing-moldopening pull B" of the core pull mode are stored as a pair. Further, as shown in FIG. 4, "mold closing start" of the core setting start mode and "mold opening completion" of the core pull start mode are stored as a pair.

In the conversion table 38, "parallel Nc" of the core setting start mode and "parallel Nc" of the core pull start mode represent that, for example, the core pull start mode corresponding to "parallel 1" of the core setting start mode is "parallel 1". Similarly, in the conversion table 38, "continuation Nc" of the core setting start mode and "continuation Nc" of the core pull start mode represent that, for example, the core pull start mode corresponding to "continuation 1" of the core setting start mode is "continuation 1".

[About Second Operation Condition Setup Unit]

The second operation condition setup unit 36 automatically sets operation conditions for core pull operations when "ON" has been selected at the reverse order setting selection portion 65 on the setting operation condition setup screen 50. The second operation condition setup unit 36 sets the operation conditions for the pull operations so that the order of the cores for which the pull operations are performed becomes reverse to the order of the cores for which the setting operations are performed.

Figure 5:
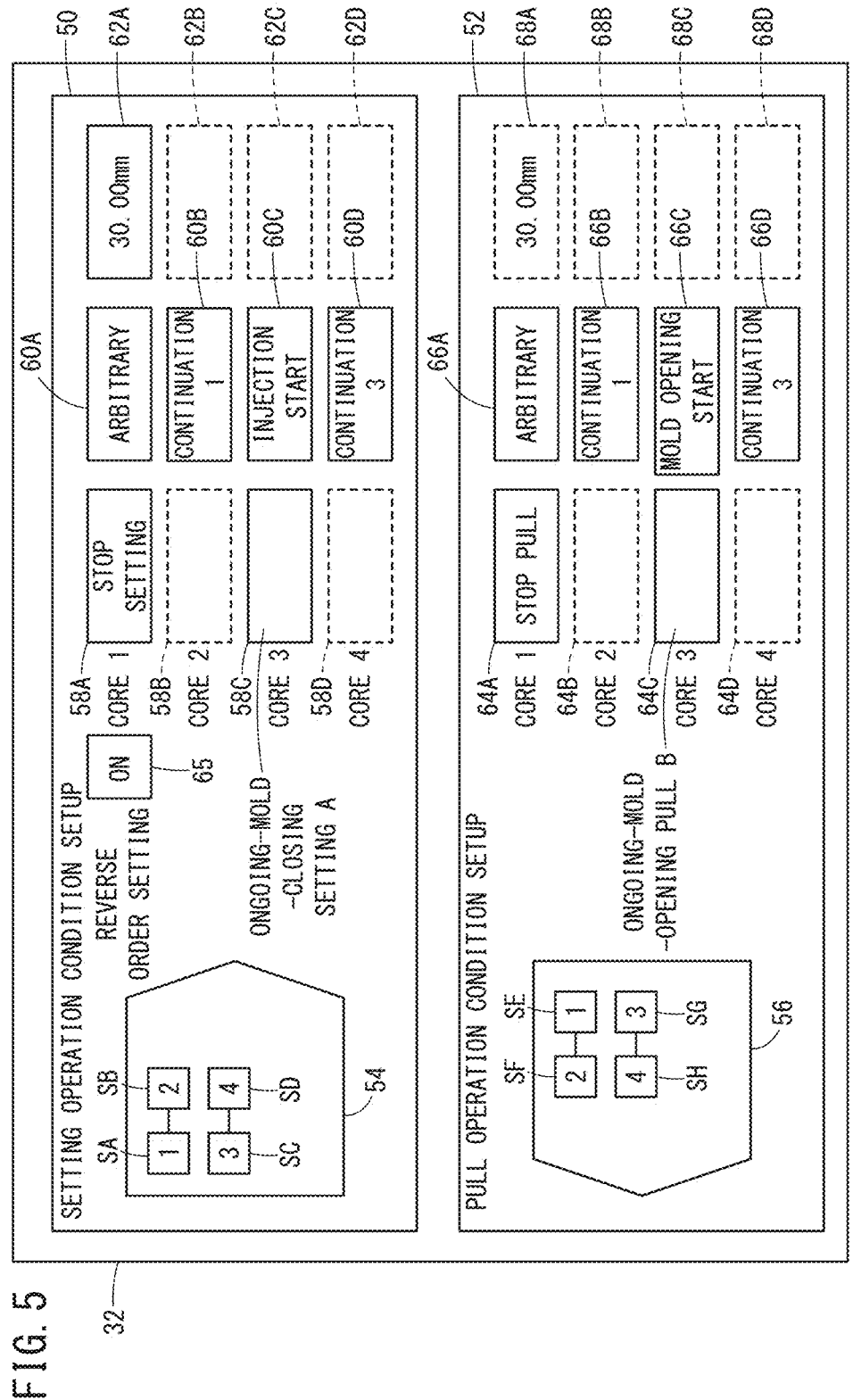
FIG. 5 is an illustration showing the setting operation condition setup screen and the pull operation condition setup screen in another display state.

The second operation condition setup unit 36 converts the core setting modes and the core setting start modes which are set on the setting operation condition setup screen 50 into the core pull modes and the core pull start modes by reference to the conversion table 38. FIG. 5 is an illustration showing the setting operation condition setup screen 50 and the pull operation condition setup screen 52. The pull operation condition setup screen 52 shown in FIG. 5 has inputted thereto the core pull modes and the core pull start modes into which the core setting modes and the core setting start modes set on the setting operation condition setup screen 50 have been converted by reference to the conversion table 38. Incidentally, FIG. 5 is the illustration for the purpose of explaining the processing executed by the second operation condition setup unit 36, and this illustration is not actually displayed on the display unit 32.

As shown in FIG. 5, simply by converting the core setting modes and the core setting start modes set on the setting operation condition setup screen 50 into the core pull modes and the core pull start modes by reference to the conversion table 38, the order of the cores for which the pull operations are performed does not become reverse to the order of the cores for which the setting operations are performed. In the case where the core pull start modes after the conversion include "continuation 1", "continuation 2", "continuation 3" or "continuation 4", the second operation condition setup unit 36 compensates the core pull modes and the core pull start modes so that the order of the cores for which the pull operations are performed become reverse to the order of the cores for which the setting operations are performed. The pull operation condition setup screen 52 in FIG. 2 displays the core pull modes and the core pull start modes after the compensation.

Figure 6:
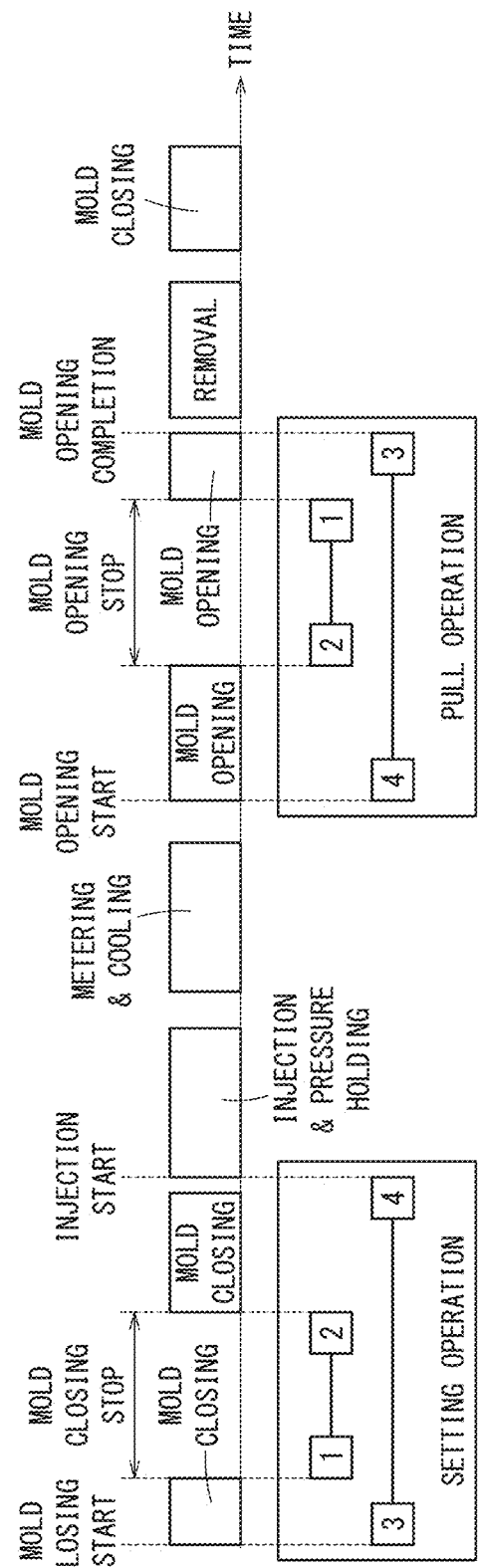
FIG. 6 is a time chart showing core operations which are operated in accordance with operation conditions for core setting operations set on the setting operation condition setup screen and operation conditions for core pull operations set on the pull operation condition setup screen, shown in FIG. 2.

FIG. 6 is a time chart showing the operations of the cores which are operated in accordance with the operation conditions for the setting operations of the cores set on the setting operation condition setup screen 50 shown in FIG. 2 and the operation conditions for the pull operations of the cores set on the pull operation condition setup screen 52 also shown in FIG. 2. As shown in FIG. 6, the order of the cores for which the pull operations are performed is reverse to the order of the cores for which the setting operations are performed.

Figure 7:
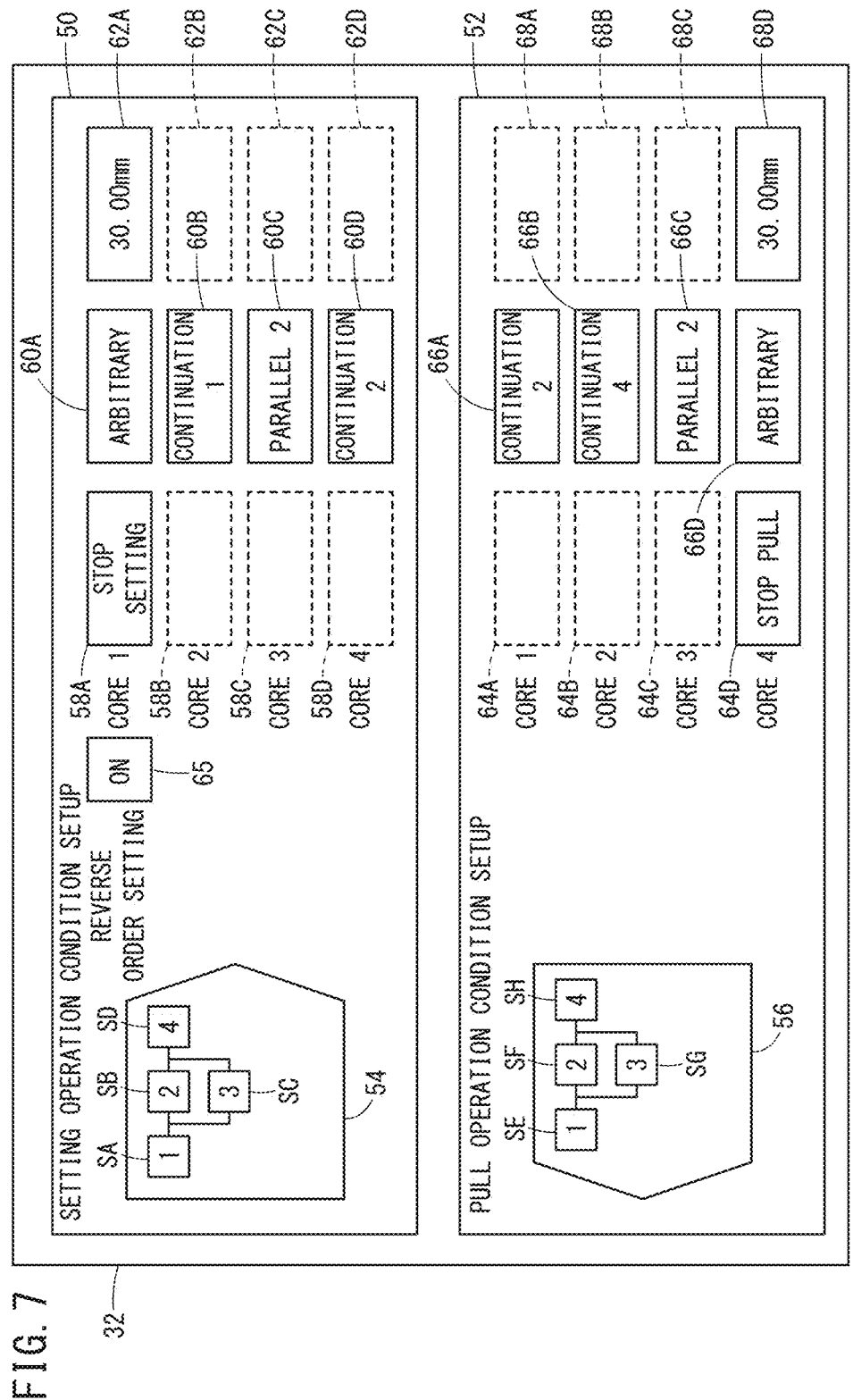
FIG. 7 is an illustration showing the setting operation condition setup screen and the pull operation condition setup screen displayed on the display unit in still another display state.
Figure 8:
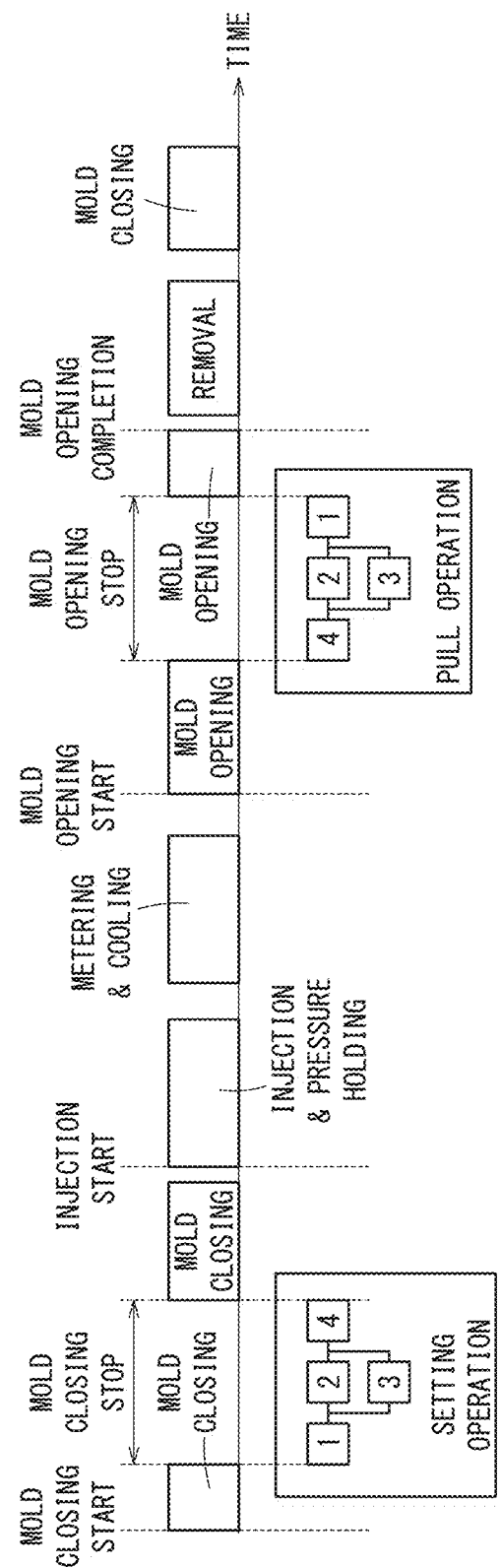
FIG. 8 is a time chart showing core operations which are operated in accordance with operation conditions for core setting operations set on the setting operation condition setup screen and operation conditions for core pull operations set on the pull operation condition setup screen, shown in FIG. 7.

Another specific example is shown with reference to FIGS. 7 and 8. FIG. 7 is an illustration showing the setting operation condition setup screen 50 and the pull operation condition setup screen 52 displayed on the display unit 32. FIG. 8 is a time chart showing the operations of the cores which are operated in accordance with the operation conditions for the setting operations of the cores set on the setting operation condition setup screen 50 in FIG. 7 and the operation conditions for the pull operations of the cores set on the pull operation condition setup screen 52 also in FIG. 7. Also in this example, as shown in FIG. 8, the order of the cores for which the pull operations are performed becomes reverse to the order of the cores for which the setting operations are performed.

[Operation Condition Setting Processing for Core]

Figure 9:
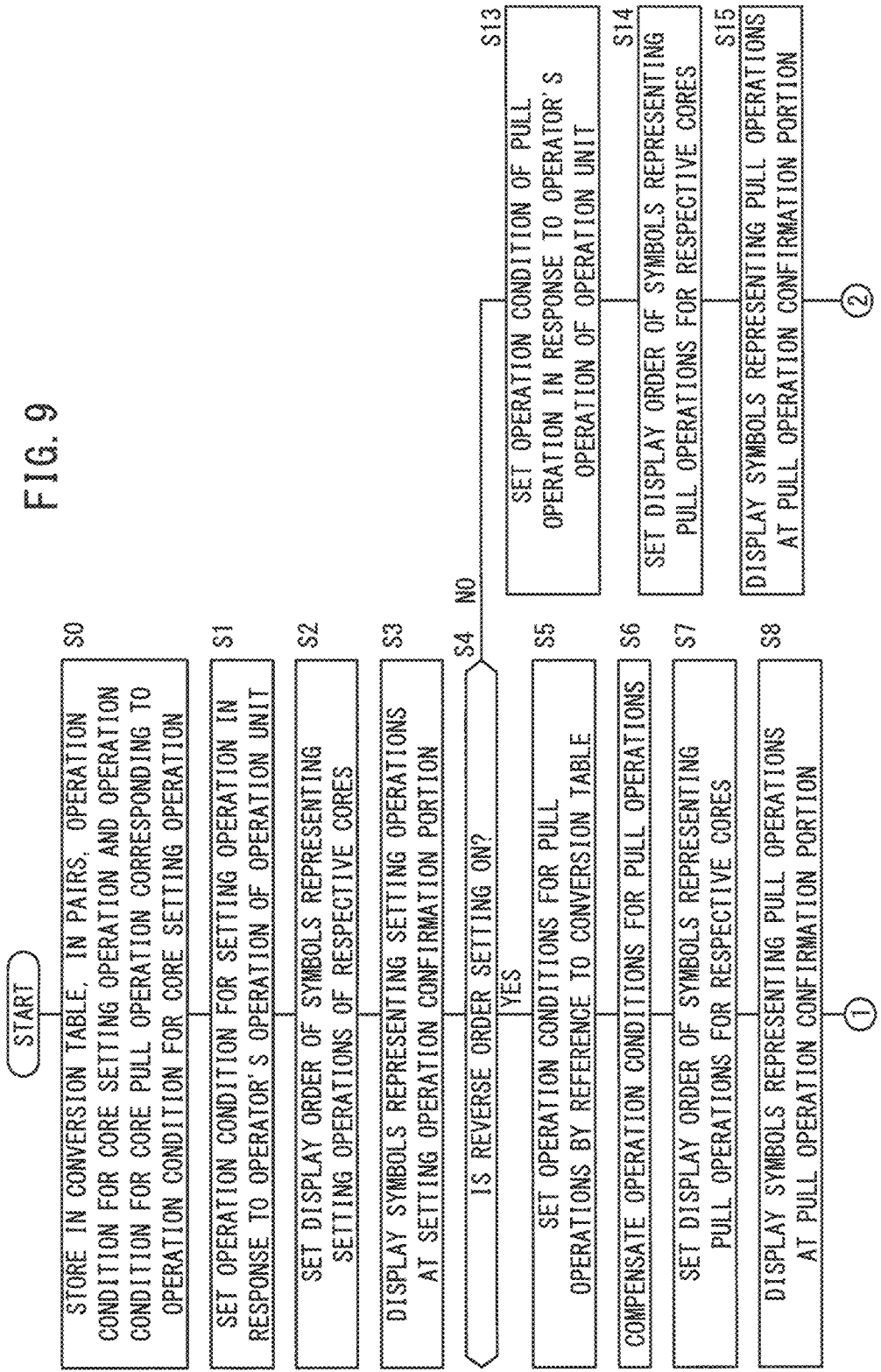
FIG. 9 is a flowchart showing a processing flow for setting conditions for the core setting operation and the core pull operation.
Figure 10:
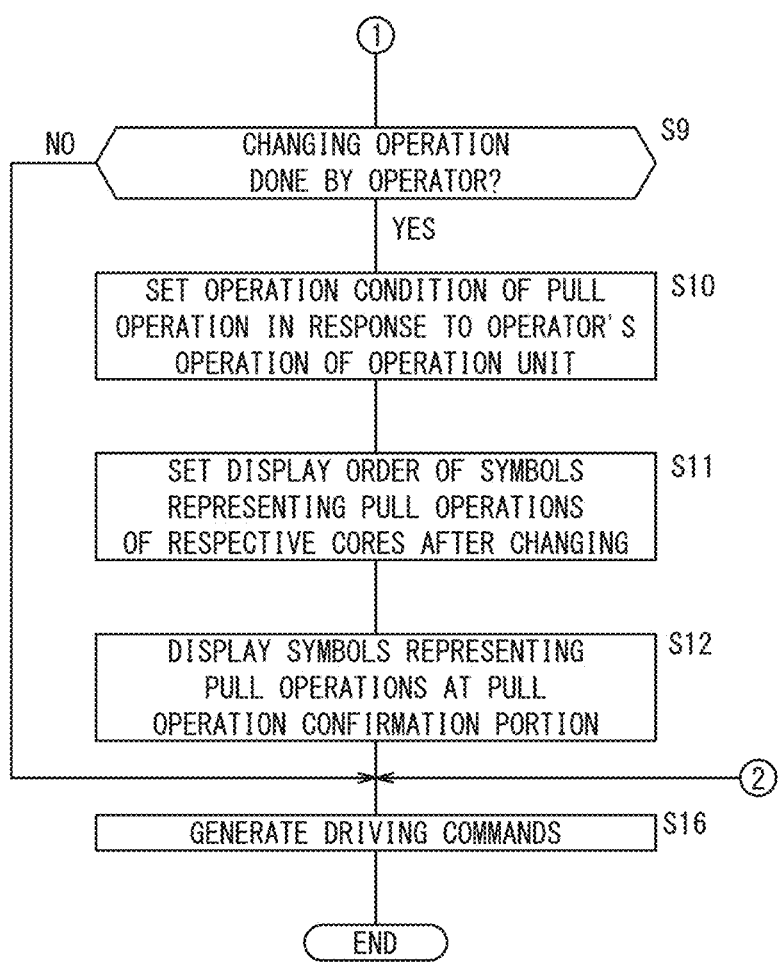
FIG. 10 is a flowchart showing a processing flow for setting conditions for the core setting operation and the core pull operation.

FIGS. 9 and 10 show a flowchart showing the flow of processing for setting the operation conditions for core setting operations and core pull operations. This processing is executed by using a processor, memories and the like mounted on the control device 12.

At step S1, the first operation condition setup unit 34 sets the operation conditions for the core setting operations in response to the operation on the setting operation condition setup screen 50 by the operator through the operation unit 30.

At step S2, in accordance with the operation conditions for the core setting operations set at the first operation condition setup unit 34, the display order setup unit 42 sets the display order of symbols SA to SD representing the setting operations for respective cores and which are displayed on the setting operation confirmation portion 54 of the setting operation condition setup screen 50.

At step S3, the display control unit 48 controls the display unit 32 to display the symbols SA to SD at the setting operation confirmation portion 54 in accordance with the display order of the symbols SA to SD representing the setting operations for the respective cores and which has been set at the display order setup unit 42.

At step S4, the second operation condition setup unit 36 determines whether or not "ON" has been selected at the reverse order setting selection portion 65 of the setting operation condition setup screen 50. If "ON" has been selected at the reverse order setting selection portion 65 of the setting operation condition setup screen 50, then the routine proceeds to step S5. If "OFF" has been selected at the reverse order setting selection portion 65 of the setting operation condition setup screen 50, the routine proceeds to step S13.

At step S5, the second operation condition setup unit 36 sets the operation conditions for the pull operations by reference to the conversion table 38.

At step S6, the second operation condition setup unit 36 compensates the operation conditions for the pull operations that have been set at step S5 so that the order of the cores for which the pull operations are performed becomes reverse to the order of the cores for which the setting operations are performed.

At step S7, the display order setup unit 42 sets the display order of the symbols SE to SH representing the operations of the respective cores and which are displayed at the pull operation confirmation portion 56 of the pull operation condition setup screen 52, in accordance with the operation conditions for the pull operations of the cores that have been set on the second operation condition setup unit 36.

At step S8, the display control unit 48 controls the display unit 32 to display the symbols SE to SH at the pull operation confirmation portion 56 in accordance with the display order of the symbols SE to SH representing the pull operations of the respective cores and which has been set at the display order setup unit 42.

At step S9, the operation condition change unit 40 determines whether or not the operation conditions for the pull operations of the cores set at the second operation condition setup unit 36 has been changed through the operation of the operation unit 30 by the operator. The routine proceeds to step S10 if the operation for changing the operation conditions for the pull operations of the cores has been performed. If the operation for changing the operation conditions for the pull operations of the cores has not been performed, the routine proceeds to step S16.

At step S10, the operation condition change unit 40 changes the operation conditions for the core pull operations in response to the operation on the pull operation condition setup screen 52 by the operator through the operation unit 30.

At step S11, in accordance with the operation conditions for the core pull operations having been changed by the operation condition change unit 40, the display order setup unit 42 sets the display order of the symbols SE to SH representing the pull operations for the respective cores and which are displayed at the pull operation confirmation portion 56 on the pull operation condition setup screen 52 and.

At step S12, the display control unit 48 controls the display unit 32 to display the symbols SE to SH at the pull operation confirmation portion 56 in the display order of the symbols SE to SH representing the pull operations of the respective cores and which has been set at the display order setup unit 42.

At step S13 to which the routine proceeds if the determination at step S4 is "NO", the second operation condition setup unit 36 sets the operation conditions for the core pull operations in response to the operation by the operator on the pull operation condition setup screen 52 through the operation unit 30.

At step S14, in accordance with the operation conditions for the core pull operations having been set by the second operation condition setup unit 36, the display order setup unit 42 sets the display order of the symbols SE to SH representing the pull operations of the respective cores and which are displayed at the pull operation confirmation portion 56 on the pull operation condition setup screen 52.

At step S15, the display control unit 48 controls the display unit 32 to display the symbols SE to SH at the pull operation confirmation portion 56 in the display order of the symbols SE to SH representing the pull operations of the respective cores and which has been set by the display order setup unit 42.

At step S16 which comes after the operation conditions for the setting operations and the operation conditions for the pull operations have been set, the driving command generation unit 44 generates driving commands to drive the screw rotating motor 14, the injection motor 16, the mold opening and closing motor 18, the ejector motor 20 and the core operation actuator 22 of the injection molding machine 10 in accordance with the set operation conditions for the setting operations and the set operation conditions for the pull operations.

Incidentally, in the present embodiment, the second operation condition setup unit 36 is configured to automatically set the operation conditions for the pull operations in accordance with the operation conditions for the setting operations having been set by the operator. However, the second operation condition setup unit 36 may be configured to automatically set the operation conditions for the setting operations in accordance with the operation conditions for the pull operations set by the operator.

Advantageous Effects

Heretofore, the settings of an operation condition for a core setting operation and an operation condition for a core pull operation have been manually performed by the operator, so that the burden on the operator has been heavy.

To overcome this problem, in the present embodiment, although the setting of the operation condition for the setting operation for each core is manually performed by the operator, the setting of the operation condition for the pull operation for each core is designed to be automatically performed by the control device 12. Therefore, it is possible to reduce the burden on the operator in setting the operation condition for the setting operation and the operation condition for the pull operation for each core.

Further, in the present embodiment, the operation condition for the core setting operation is converted into the operation condition for the core pull operation by reference to the conversion table 38. Thus, it is possible to reduce load of the processing which is executed by the control device 12 in order to set the operation condition for the pull operation in correspondence to the operation condition for the setting operation of the core.

Further, in the present embodiment, the operation condition for the core pull operation which is automatically set by the control device 12 is changed by the operator's operation of the operation unit 30. Thus, it is possible for the operator to freely change the operation condition for the core pull operation based on the automatically-set operation condition for the core pull operation, and hence it is possible to reduce the burden on the operator while securing flexibility in setting the operation condition for the core pull operation.

Technical Idea or Concept Grasped from Embodiment

The technical concept graspable from the foregoing embodiment will be described hereunder.

The control device (12) for an injection molding machine (10) controls a setting operation for setting a core in a mold in conjunction with a mold closing operation of the mold in the injection molding machine (10) and a pull operation for removing the core from the mold in conjunction with a mold opening operation of the mold, wherein the control device (12) includes a first operation condition setup unit (34) configured to set an operation condition for one of the core setting operation and the core pull operation; a conversion table (38) configured to store, in pairs, an operation condition for the core setting operation and an operation condition for the core pull operation corresponding to the operation condition for the core setting operation; a second operation condition setup unit (36) configured to set, by reference to the conversion table (38), an operation condition for the other of the core pull operation and the core setting operation in correspondence to the operation condition, set by the first operation condition setup unit (34), for the one of the core setting operation and the core pull operation; and a driving command generation unit (44) configured to generate a driving command configured to drive the injection molding machine (10) to perform the setting operation and the pull operation in accordance with the operation conditions set in the first operation condition setup unit (34) and the second operation condition setup unit (36). With this configuration, it is possible to reduce the burden to the operator in setting the operation condition for the core setting operation and the operation condition for the core pull operation.

In the aforementioned control device (12) for the injection molding machine (10), the conversion table (38) may store at least one of: information containing, in pairs, a stop setting mode of, during the mold closing operation of the mold, stopping the mold at an arbitrary first position and then performing the setting operation, and a stop pull mode of, during the mold opening operation of the mold, stopping the mold at the first position and then performing the pull operation; information containing, in pairs, a first ongoing-mold-closing setting mode of, during the mold closing operation of the mold, performing the setting operation while the mold is moving from a mold closing start position to an arbitrary second position, and a first ongoing-mold-opening pull mode of, during the mold opening operation of the mold, performing the pull operation while the mold is moving from the second position to a mold opening completion position; information containing, in pairs, a second ongoing-mold-closing setting mode of, during the mold closing operation of the mold, performing the setting operation while the mold is moving from an arbitrary third position to a mold closing completion position, and a second ongoing-mold-opening pull mode of, during the mold opening operation of the mold, performing the pull operation while the mold is moving from a mold opening start position to the third position; and information containing, in pairs, a removal completion setting mode of performing the setting operation when removing of a molded article from the mold is completed, and a removal start pull mode of performing the pull operation when the removing of the molded article from the mold is started. With this configuration, it is possible to reduce the load of the processing, executed in the control device (12), for setting the operation condition for the pull operation in correspondence to the operation condition for the core setting operation.

In the aforementioned control device (12) for the injection molding machine (10), the control device (12) may further include an operation condition change unit (40) configured to change the operation condition, set by the second operation condition setup unit (36), for the other of the core setting operation and the core pull operation, in response to operation performed by the operator. With this configuration, the operator is able to freely change the operation condition for the core pull operation based on the automatically-set operation condition for the core pull operation. Therefore, it is possible to reduce the burden to the operator while securing flexibility in setting the operation condition for the core pull operation.

A control method for an injection molding machine (10) controls a setting operation for setting a core in a mold in conjunction with a mold closing operation of the mold in the injection molding machine (10) and a pull operation for removing the core from the mold in conjunction with a mold opening operation of the mold, wherein the control method includes a first operation condition setting step of setting an operation condition for one of the core setting operation and the core pull operation; a second operation condition setting step of setting an operation condition for the other of the core pull operation and the core setting operation depending on the operation condition, set at the first operation condition setting step, for the one of the core setting operation and the core pull operation, by reference to a conversion table (38) configured to store, in pairs, an operation condition for the core setting operation and an operation condition for the core pull operation corresponding to the operation condition for the core setting operation; and a driving command generation step of generating a driving command configured to drive the injection molding machine (10) to perform the setting operation and the pull operation in accordance with the operation conditions set at the first operation condition setting step and the second operation condition setting step. With this configuration, it is possible to reduce the burden on the operator in setting the operation condition for the core setting operation and the operation condition for the core pull operation.

In the aforementioned control method for the injection molding machine (10), the conversion table (38) may store at least one of: information containing, in pairs, a stop setting mode of, during the mold closing operation of the mold, stopping the mold at an arbitrary first position and then performing the setting operation, and a stop pull mode of, during the mold opening operation of the mold, stopping the mold at the first position and then performing the pull operation; information containing, in pairs, a first ongoing-mold-closing setting mode of, during the mold closing operation of the mold, performing the setting operation while the mold is moving from a mold closing start position to an arbitrary second position, and a first ongoing-mold-opening pull mode of, during the mold opening operation of the mold, performing the pull operation while the mold is moving from the second position to a mold opening completion position; information containing, in pairs, a second ongoing-mold-closing setting mode of, during the mold closing operation of the mold, performing the setting operation while the mold is moving from an arbitrary third position to a mold closing completion position, and a second ongoing-mold-opening pull mode of, during the mold opening operation of the mold, performing the pull operation while the mold is moving from a mold opening start position to the third position; and information containing, in pairs, a removal completion setting mode of performing the setting operation when removing of a molded article from the mold is completed, and a removal start pull mode of performing the pull operation when the removing of the molded article from the mold is started. With this configuration, it is possible to reduce the load of the processing, executed by the control device (12), for setting the operation condition for the pull operation in correspondence to the operation condition for the core setting operation.

In the aforementioned control method for the injection molding machine (10), the control method may further include an operation condition change step of changing the operation condition, set at the second operation condition setting step, for the other of the core setting operation and the core pull operation, in response to operation performed by the operator. With this configuration, the operator is able to freely change the operation condition for the core pull operation based on the operation condition for the core pull operation set automatically. Therefore, it is possible to reduce the burden on the operator while securing flexibility in setting the operation condition for the core pull operation.

While the invention has been particularly shown and described with reference to the preferred embodiments, it will be understood that variations and modifications can be effected thereto by those skilled in the art without departing from the scope of the invention as defined by the appended claims.

What is claimed is:

1. A control device for an injection molding machine, the control device being configured to control a core setting operation for setting a core in a mold in conjunction with a mold closing operation of the mold in the injection molding machine and a core pull operation for removing the core from the mold in conjunction with a mold opening operation of the mold, the control device comprising a processor configured to:

set an operation condition for one of the core setting operation and the core pull operation, wherein the operation condition for the core setting operation comprises a mode for the core setting operation, and wherein the operation condition for the core pull operation comprises a mode for the core pull operation;

store, in pairs in a conversion table, an operation condition for the core setting operation with an operation condition for the core pull operation corresponding to the operation condition for the core setting operation;

set, by reference to the conversion table, an operation condition for another of the core pull operation and the core setting operation in correspondence to the operation condition, previously set, for the one of the core setting operation and the core pull operation; and generate a driving command configured to drive the injection molding machine to perform the core setting operation and the core pull operation in accordance with the operation conditions previously set.

2. The control device for the injection molding machine according to claim 1, wherein the processor stores, in the conversion table, at least one of:

information containing, in pairs, a stop setting mode of, during the mold closing operation of the mold, stopping the mold at an arbitrary first position and then performing the core setting operation, and a stop pull mode of, during the mold opening operation of the mold, stopping the mold at the first position and then performing the core pull operation;

information containing, in pairs, a first ongoing-mold-closing setting mode of, during the mold closing operation of the mold, performing the core setting operation while the mold is moving from a mold closing start position to an arbitrary second position, and a first ongoing-mold-opening pull mode of, during the mold opening operation of the mold, performing the core pull operation while the mold is moving from the second position to a mold opening completion position;

information containing, in pairs, a second ongoing-mold-closing setting mode of, during the mold closing operation of the mold, performing the core setting operation while the mold is moving from an arbitrary third position to a mold closing completion position, and a second ongoing-mold-opening pull mode of, during the mold opening operation of the mold, performing the core pull operation while the mold is moving from a mold opening start position to the third position; and information containing, in pairs, a removal completion setting mode of performing the core setting operation when removing of a molded article from the mold is completed, and a removal start pull mode of performing the core pull operation when the removing of the molded article from the mold is started.

3. The control device for the injection molding machine according to claim 1, wherein the processor is further configured to:

change the operation condition, previously set, for the other of the core setting operation and the core pull operation, in response to an operation performed by an operator.

4. A control method for an injection molding machine, for controlling a core setting operation for setting a core in a mold in conjunction with a mold closing operation of the mold in the injection molding machine and a core pull operation for removing the core from the mold in conjunction with a mold opening operation of the mold, the control method comprising:

setting, by a processor of a control device, an operation condition for one of the core setting operation and the core pull operation, wherein the operation condition for the core setting operation comprises a mode for the core setting operation, and wherein the operation condition for the core pull operation comprises a mode for the core pull operation;

storing, in pairs in a conversion table, an operation condition for the core setting operation with an operation condition for the core pull operation corresponding to the operation condition for the core setting operation;

setting, by the processor of the control device, and by reference to the conversion table, an operation condition for another of the core pull operation and the core setting operation in correspondence to the operation condition, previously set, for the one of the core setting operation and the core pull operation; and generating, by the processor of the control device, a driving command configured to drive the injection molding machine to perform the core setting operation and the core pull operation in accordance with the operation conditions previously set.

5. The control method for the injection molding machine according to claim 4, wherein the conversion table stores at least one of:

information containing, in pairs, a stop setting mode of, during the mold closing operation of the mold, stopping the mold at an arbitrary first position and then performing the core setting operation, and a stop pull mode of, during the mold opening operation of the mold, stopping the mold at the first position and then performing the core pull operation;

information containing, in pairs, a first ongoing-mold-closing setting mode of, during the mold closing operation of the mold, performing the core setting operation while the mold is moving from a mold closing start position to an arbitrary second position, and a first ongoing-mold-opening pull mode of, during the mold opening operation of the mold, performing the core pull operation while the mold is moving from the second position to a mold opening completion position;

information containing, in pairs, a second ongoing-mold-closing setting mode of, during the mold closing operation of the mold, performing the core setting operation while the mold is moving from an arbitrary third position to a mold closing completion position, and a second ongoing-mold-opening pull mode of, during the mold opening operation of the mold, performing the core pull operation while the mold is moving from a mold opening start position to the third position; and information containing, in pairs, a removal completion setting mode of performing the core setting operation when removing of a molded article from the mold is completed, and a removal start pull mode of performing the core pull operation when the removing of the molded article from the mold is started.

6. The control method for the injection molding machine according to claim 4, further comprising:

changing, by the processor of the control device, the operation condition, previously set, for the other of the core setting operation and the core pull operation, in response to an operation performed by an operator.

* * * * *